Reissued Mar. 31, 1931

Re. 18,013

UNITED STATES PATENT OFFICE

VALENTIN DIETZ, OF FRANKFORT-ON-THE-MAIN, GERMANY, ASSIGNOR, BY MESNE ASSIGNMENTS, TO THE AMERICAN MULTIGRAPH CO., OF CLEVELAND, OHIO, A CORPORATION OF DELAWARE

PLANOGRAPHIC-PRINTING PROCESS

No Drawing. Original No. 1,741,758, dated December 31, 1929, Serial No. 293,779, filed June 18, 1928, and in Germany January 20, 1927. Application for reissue filed August 2, 1930. Serial No. 472,747.

My invention relates to an improved dry-offset printing process. It has been suggested heretofore to print by means of flat printing members without using a sponging liquid, but as far as my knowledge goes, this problem has not been solved in a satisfactory manner. All attempts that have been made heretofore to substitute for the sponging or wiping water a means, such as the addition of acids or metallic salts to the preparing liquid, have proved a failure since, as soon as moistening is dispensed with, the printing member will at once take up and hold the printing ink outside of the figures to be typed so that accurate printing is impossible.

It has also been proposed heretofore, to mix so-called tone-protecting metallic salts or acids with the printing ink instead of the preparing liquid. All these prior suggestions, however, failed to be reliable substitutes for the old moistening operation, the more so since they involve the disadvantage of injuriously affecting the prints and damaging the metal, so that the efficiency and life of the printing member will be considerably reduced thereby.

I have found, after much study and research, that absolutely tone-free prints or copies can be obtained by means of flat printing members if, in the case of employing aluminium as a printing metal, both the preparing liquid and the printing ink are mixed with the metallic nitrates or sulfates, such as aluminum nitrate or sulphate. The nitrates of nickel, iron and copper can also be used. These salts do not injuriously affect the print nor the aluminium, and I have found that the said salts have a tone-protecting effect and at the same time act to improve the quality of the print, in contradistinction to the means hitherto employed or suggested, so that a great many more copies can be taken than hitherto possible in the wet-offset printing process.

Moreover, the use of metallic nitrates or sulfates, according to my invention, considerably simplifies the troublesome and precarious reprinting process as hitherto practised and affords a more reliable base to the latter. When an aluminium plate is directly written upon or covered with drawings, or the scriptural characters are copied thereon, for example, by means of a suitable reprinting ink, it will be sufficient to moisten the plate inclusive of the scriptural characters with an aqueous solution of a metallic nitrate or sulfate and to apply thereto a printing ink which is likewise mixed with a metallic nitrate or a sulfate. The printing characters will be improved or enriched thereby and absorb the ink readily, whereas all other parts of the printing plate repel the ink thoroughly and remain absolutely tone-free. Any usual fatty ink or fatty pencil may be employed for writing the scriptural characters. In case of type-writing, a black ink-ribbon of conventional nature will do, but particularly a ribbon cut from or consisting of ordinary carbon paper will give the best results. A carbon paper ribbon is inexpensive and has the further advantage of producing more precise, sharp and well-defined copies.

The steps of the process are as follows:

1. Ink image is located on an ordinary planographic metal plate by any suitable process, such as drawing directly on the plate with a lithographic crayon, transferring a design previously prepared on transfer paper, or by any of the methods well known in photo-lithography for locating an image on a plate.

2. The plate is treated by covering the surface with a solution prepared in accordance with the present application. This solution is prepared by dissolving about 5% of metallic nitrates or sulphates or both in any kind of suitable liquid, such as water.

3. The plate is now prepared for printing by rubbing the printing surface with said solution in order to condition it for the ink. This conditioning results from the solution leaving a film of crystals or particles of the metallic nitrates or sulphates on the fat-free surfaces of the plate, which film will subsequently prevent the adherence of the printing ink to the plate except on the previously prepared image. The solution will at the same time clean the surface of all foreign matter, such as ink spots or dirt. The plate is then allowed to become perfectly dry and needs no further dampening for printing.

3a. A special ink has been prepared beforehand for applying on the plate. This ink is composed of any known common off-set ink containing, for instance, linseed oil and lampblack or other coloring matter, together with 3 to 8% of metallic nitrate or sulphate or both intimately mixed with the other ingredients. In the case of an aluminum plate, aluminum nitrate or aluminum sulphate would be used.

4. The plate needs no dampening and the special ink is now applied directly on the dried printing surface which does not retain ink on non-image areas which have a dry protective coating due to the treatment described.

5. The plate is now ready for printing and any number of copies can be made from the plate on which the ink is renewed by repeated applications. The supply of crystals or particles in the non-image areas is replenished from the metallic nitrate or sulphate salts contained in the ink.

In general, it may be stated that the most satisfactory results are obtained by using essentially the same chemical in the ink for a given printing operation as used to treat the plate.

The exact theory of operation of this process is at present unknown. It seems as if the solution of nitrates or sulphates formed a protective coating over the non-printing areas of the plate, but that the ink has a certain small affinity for such nitrates or sulphates so that ordinary printer's ink alone would take off the protective coating from the plate, while by mixing a substance similar to the coating with ink itself in sufficient quantity to satisfy the affinity of that ink, the ink becomes neutral and does not disturb the coating on the plate. There is apparently enough affinity of the greasy image for the solution, so that the solution which overlies the image is absorbed by it, and the image, therefore, presents simply a greasy face which receives the ink from the inking roller.

Another theory of operation, which seems to fit the outstanding observed facts, is that the chemical in the wash applied to the plate, makes either a coating mechanically adhering to the plate or has a chemical reaction with the plate altering its original surface. In either case the new surface seems to be a salt which is ink repellent. Now during the operation, as the successive sheets of paper would tend to carry away this surface or coating, it is maintained by chemical coming to the plate from the ink, so that its non-printing areas are constantly protected.

Perhaps the actual operation is by a combination of both these theories, the plate being normally protected by the new surface, and the ink's affinity being normally satisfied by the inserted chemical, and then if the plate loses any of its surface in use, the ink (which may at the same time become stronger in the chemical by reason of the pigment being extracted by the paper being printed) will give up some of its chemical to the plate. There would thus be a sort of balanced condition obtained where both the inking roller and the coating on the plate maintain themselves in what might be characterized as a saturated condition.

In the case of using metallic salts, I propose to use only the salts of metals, which metals are solid at normal temperature (this excluding mercury, for example). A disadvantage of using salts of mercury is that these produce an amalgam with the metal of the plate, in most cases, and diffuse through the metal of the plate, changing its general structure and rendering it generally unsatisfactory for printing.

It will be understood that I have mentioned an aluminum plate in the above disclosure by way of example only, and that the invention is applicable to substances other than aluminum which are suitable for use as printing plates. I believe these materials include only those which are fat-free.

It will be evident that my invention, while still being adhered to in its main essentials, may be varied and adapted in many ways, according to requirements desired or found most suitable under different circumstances.

I claim:

1. A printing process comprising preparing a printing plate with an image and with a substance carrying a material selected from the group containing the salts of nitric and sulphuric acid and then printing from such plate with an ink carrying a material selected from said group.

2. A printing process, comprising the following steps, first, preparing a printing plate with an image to be printed, and with a substance carrying a material selected from the group containing metallic nitrates and metallic sulphates, and then printing from such plate with an ink carrying a material selected from said group.

3. A printing process consisting in providing a text directly on a plate by means of a fatty ink and then treating said plate with a solution of a material selected from the group consisting of metallic nitrates and metallic sulphates and finally applying a fatty ink containing material selected from said group.

4. A printing process in which a printing plate is first provided with a text by means of a fatty ink, second, treating a plate with a solution of a material selected from a group containing metallic nitrates and metallic sulphates and printing from said plate with an ink which contains material from said group.

5. A printing process consisting in providing a text directly on a plate by means of a fatty ink and then treating said plate with a solution of a metallic nitrate and printing from said plate with an ink containing a metallic nitrate.

6. A printing process, comprising preparing a printing plate with an image and treating the surface of the plate with a substance which remains only at the surface and which will render the plate initially ink repellent on the non-image portions thereof, and thereafter printing from the plate using an ink mixed with a substance which will continue the surface treatment, and will maintain the non-image portions of the plate in ink repellent condition.

7. A dry lithographic printing process, comprising preparing a printing plate with an image and treating the surface of the plate with a coating adapted to adhere thereto and remain only at the surface and which will render the plate initially ink repellent on the non-image portions thereof, and thereafter printing from the plate using an ink mixed with a substance similar to the original plate treating substance to continue the surface treatment and maintain the non-image portions of the plate in ink repelling condition.

8. A printing process comprising preparing a printing plate with an image and with a non-hygroscopic non-penetrating substance to render non-image surface portions of the plate ink repellent without penetrating the internal structure of the plate, and printing from such plate, using an ink containing a substance mixed therewith and adapted to maintain the non-image portions in ink repelling condition.

9. A printing process comprising preparing a printing plate with an image, treating the plate to initially render a non-image surface thereof ink repellent without changing the characteristic of the interior of the plate, and printing from said plate with an ink having mixed therewith a salt of a metal which metal is solid at normal temperature.

In testimony whereof I affix my signature.

VALENTIN DIETZ.

CERTIFICATE OF CORRECTION.

Reissue Patent No. 18,013. Granted March 31, 1931, to

VALENTIN DIETZ.

It is hereby certified that the above numbered patent was erroneously issued to "The American Multigraph Co., of Cleveland, Ohio, a corporation of Delaware", whereas said patent should have been issued to American Multigraph Co., of Cleveland, Ohio, a corporation of Delaware, as assignee by mesne assignments of the entire interest in said invention, as shown by the records of assignments in this office; and that the said Letters Patent should be read with this correction therein that the same may conform to the record of the case in the Patent Office.

Signed and sealed this 12th day of May, A. D. 1931.

(Seal)

M. J. Moore,
Acting Commissioner of Patents.